United States Patent
Scholtes et al.

(10) Patent No.: US 10,738,650 B2
(45) Date of Patent: Aug. 11, 2020

(54) DEVICE FOR DEICING A SPLITTER NOSE AND INLET GUIDE VANES OF AN AVIATION TURBINE ENGINE

(71) Applicant: SAFRAN AIRCRAFT ENGINES, Paris (FR)

(72) Inventors: Christophe Scholtes, Moissy-Cramayel (FR); Antoine Robert Alain Brunet, Moissy-Cramayel (FR); Simon Jose Pierre Amoedo, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 177 days.

(21) Appl. No.: 16/071,524

(22) PCT Filed: Jan. 10, 2017

(86) PCT No.: PCT/FR2017/050048
§ 371 (c)(1),
(2) Date: Jul. 20, 2018

(87) PCT Pub. No.: WO2017/125663
PCT Pub. Date: Jul. 27, 2017

(65) Prior Publication Data
US 2019/0024533 A1    Jan. 24, 2019

(30) Foreign Application Priority Data

Jan. 22, 2016  (FR) ...................................... 16 50510

(51) Int. Cl.
*F02C 7/047*     (2006.01)
*F01D 25/02*     (2006.01)
(Continued)

(52) U.S. Cl.
CPC ............. *F01D 25/02* (2013.01); *B64D 15/04* (2013.01); *F01D 25/246* (2013.01); *F02C 7/047* (2013.01); *F02K 3/06* (2013.01); *F05D 2240/121* (2013.01)

(58) Field of Classification Search
CPC ......... F02C 7/047; F01D 25/02; B64D 15/04; B64D 2033/0233
See application file for complete search history.

(56) References Cited

U.S. PATENT DOCUMENTS

| | | | |
|---|---|---|---|
| 8,764,387 B2 * | 7/2014 | Jordan | F01D 5/022 415/144 |
| 10,017,259 B2 * | 7/2018 | Bouillon | F01D 25/02 |

(Continued)

FOREIGN PATENT DOCUMENTS

| FR | 3004485 A1 | 10/2014 |
|---|---|---|
| WO | WO 2014/182289 A1 | 11/2014 |

OTHER PUBLICATIONS

International Search Report dated Apr. 28, 2017, in PCT/FR2017/050048, filed Jan. 10, 2017.

*Primary Examiner* — William H Rodriguez
(74) *Attorney, Agent, or Firm* — Oblon, McClelland, Maier & Neustadt, L.L.P.

(57) ABSTRACT

A deicer device deices both a splitter nose and inlet guide vanes of an aviation turbine engine. The device includes a splitter nose to split a stream coming from the fan into primary and secondary stream flow channels of annular shape and an inner shroud to which inlet guide vanes are fastened and including a hook that holds the inner shroud axially at its upstream end against the inner annular wall. An outer surface facing of the hook forms an angle of less than 90° with an injection orifice such that the outer surface comes progressively closer to the outer annular wall on going away from the injection orifice. The outer surface of (Continued)

the hook presents a minimum amount of clearance J relative to the outer annular wall such that $0.2 \leq J/D \leq 0.6$ where D is the hydraulic diameter of an injection orifice.

6 Claims, 2 Drawing Sheets

(51) Int. Cl.
*F01D 25/24* (2006.01)
*F02K 3/06* (2006.01)
*B64D 15/04* (2006.01)

(56) References Cited

U.S. PATENT DOCUMENTS

| | | | |
|---|---|---|---|
| 10,060,351 B2* | 8/2018 | Oggero | B64D 15/04 |
| 10,138,755 B2* | 11/2018 | Gomanne | F01D 25/02 |
| 10,494,997 B2* | 12/2019 | Lourit | F02C 7/047 |
| 2003/0035719 A1* | 2/2003 | Wadia | F01D 25/02 |
| | | | 415/145 |
| 2008/0159852 A1* | 7/2008 | Stephenson | F01D 5/046 |
| | | | 415/178 |
| 2016/0032762 A1 | 2/2016 | Gomanne et al. | |
| 2016/0097323 A1 | 4/2016 | Prather et al. | |
| 2016/0108754 A1* | 4/2016 | Herbaut | B64D 15/12 |
| | | | 415/121.3 |
| 2018/0216528 A1* | 8/2018 | Linassier | F01D 25/02 |

\* cited by examiner

DEVICE FOR DEICING A SPLITTER NOSE AND INLET GUIDE VANES OF AN AVIATION TURBINE ENGINE

BACKGROUND OF THE INVENTION

The present invention relates to the general field of turbine engines. The invention relates more particularly to a system for deicing a splitter nose and inlet guide vanes of the primary passage through the turbine engine.

In an aviation turbine engine of the two-spool bypass type, the primary and secondary streams are split into respective flow passages downstream from the fan by means of a splitter nose. Within the primary passage, at the inlet to the low-pressure compressor (also commonly referred to as a "booster"), there is to be found a set of inlet guide vanes (IGVs).

During certain stages of flight, and also on the ground, the engines may encounter icing atmospheric conditions, in particular when ambient temperature is low enough and when humidity is high. Under such conditions, ice can form on the splitter nose and on the inlet guide vanes. When this phenomenon occurs, it can lead to the primary passage becoming partially or totally obstructed, and to blocks of ice breaking off and being ingested in the primary passage. An obstruction of the primary passage leads to the combustion chamber being fed with insufficient air, which chamber may then flame out, or the engine may be prevented from accelerating. In the event of blocks of ice breaking off, they can damage the compressor situated downstream and they can also lead to the combustion chamber flaming out.

In order to avoid ice forming on the splitter nose, known techniques include bleeding off hot air from a compressor in the primary passage, and injecting that hot air into the inside of the splitter nose. Thereafter, the hot air injected into the splitter nose can run along an inside wall of the nose until it reaches holes or grooves configured to inject the hot air into the primary passage towards the vanes for deicing. Using holes in the inner shroud carrying the guide vanes enables jets of hot air to be formed that can deice the inlet guide vanes, in part. Nevertheless, the holes or grooves in those devices cannot be located far enough upstream from the inlet guide vanes, which leaves little room for the jets to penetrate deeply into the primary passage so as to deice the vanes over a height that is sufficient.

Finally, the flow rate of hot air necessary for deicing the splitter nose and for ensuring that the jets of hot air for deicing the vanes can combat the stream of cold air entering into the primary passage is itself large. Bleeding off hot air in this way can reduce the performance and the operability of the turbine engine. It would therefore be desirable to be able to increase the effectiveness with which the nose and the inlet guide vanes are deiced without that simultaneously increasing the amount of hot air bled off from the compressor.

OBJECT AND SUMMARY OF THE INVENTION

A main object of the present invention is thus to proposed a deicer device for deicing a splitter nose and inlet guide vanes, which device provides improved deicing both of the splitter nose and also of the inlet guide vanes of the primary passage.

This object is achieved with a deicer device for deicing both a splitter nose and also inlet guide vanes of an aviation turbine engine, the device comprising:

a splitter nose for positioning downstream from a fan of the turbine engine in order to split a stream coming from the fan into primary and secondary stream flow channels of annular shape, said nose having an outer annular wall defining the inside of the secondary stream flow channel and an inner annular wall defining an inlet of the primary stream flow channel, said inner annular wall being provided with injection orifices positioned upstream from the inlet guide vanes and through which hot air is to be blown; and an inner shroud to which the inlet guide vanes are fastened and including a hook, said inner shroud being held axially at its upstream end against the inner annular wall by said hook.

In accordance with the invention, the hook has an outer surface facing the outer annular wall and forming an angle of less than 90° with the axis of an injection orifice such that the outer surface of the hook comes progressively closer to the outer annular wall on going away from said injection orifice, the outer surface of the hook presenting a minimum amount of clearance J relative to the outer annular wall such that:

$$0.2 \leq J/D \leq 0.6;$$

where D is the hydraulic diameter of the injection orifice.

In the present description, the terms "upstream" and "downstream" are defined relative to the flow direction of air through the turbine engine; the terms "inner" and "outer", "axial" and "radial", and their derivatives are defined relative to the longitudinal axis of the turbine engine.

The device of the invention enables a single stream of hot air to deice simultaneously both the splitter nose and the inlet guide vanes.

The angle of less than 90° between the outer surface of the hook and the axis of an injection orifice, and the orientation of said surface enable some minimum amount of clearance to exist between the hook and the outer annular wall of the splitter nose. This minimum amount of clearance serves to accelerate the stream of hot air flowing upstream into the inside of the splitter nose. Accelerating the stream of hot air inside the nose in this way increases the speed with which the hot air impacts against the end of the splitter nose, thereby improving deicing thereof. Furthermore, the shape of the hook of the invention provides a better distribution of the hot air stream in azimuth, i.e. along the splitter nose and around the longitudinal axis of the turbine engine. Conversely, in prior art devices, the flow of hot air is generally concentrated around the holes, thereby leading to nonuniform deicing of the splitter nose.

The inequality given above for the minimum clearance J and the diameter D of the injection orifices serves to ensure correct deicing under all operating conditions of the turbine engine.

In the device of the invention, the holes may be separate and spaced apart from the hook, and they can thus be located further upstream from the inlet guide vanes than in prior art devices. Thus, the jets of hot air travel a longer distance before penetrating into the passage and they can deice the inlet guide vanes over a greater depth within the passage.

In general manner, and compared with prior art devices, for a given flow rate of hot air bled from the engine, device of the invention makes it possible to obtain better deicing of the splitter nose and better penetration of the jets of hot air into the passage. Specifically, studies have shown in particular that the jets penetrate into the passage by up to 50% more than in prior art devices based on jets of hot air.

The hook is axisymmetric about a longitudinal axis of the turbine engine.

Preferably, the outer surface of the hook forms an angle lying in the range 40° to 70° with the axis of an injection orifice. When the hook is made in this way, the angle at which each jet of hot air penetrates into the primary passage is such that the jet slopes upstream more than it would be when using an angle lying outside this range of values. This provision further increases the depth to which the jet of hot air penetrates into the passage and improves the deicing of the inlet guide vanes.

Also preferably, the hydraulic diameter D of an injection orifice satisfies the following inequality: 2%≤D/H≤6%, where H is the distance between the injection orifice and an inner wall of the primary stream flow channel. The distance H also corresponds to the height of the flow passage for the primary stream at the injection orifices. This range of values makes it possible to ensure that the jet of hot air in the passage is adapted to the dimensions of the compressor. Specifically, for values of D/H<2%, the hot air leaving the orifice flows at a rate that is too small to provide correct deicing. For values of D/H>6%, the section of an orifice is larger and the jet that is generated is characterized by a Mach number that is small, which leads to the jet being sheared rapidly by the flow of the primary stream in the passage.

In an embodiment, each injection orifice may present a section that is circular.

The device may further comprise means for conveying hot air that are configured to deliver hot air upstream to the inside of the splitter nose.

The invention also provides an aviation turbine engine fan module comprising: a fan, a low-pressure compressor, inlet guide vanes situated upstream from the low-pressure compressor and downstream from the fan, and a deicer device as presented above, the injection orifices being positioned on the inner annular wall of the splitter nose so that, in operation, the hot air delivered by each injection orifice into the primary stream flow channel is ejected towards a leading edge of an inlet guide vane.

Finally, the invention also provides an aviation turbine engine including a fan module as presented above.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

Figure 1:
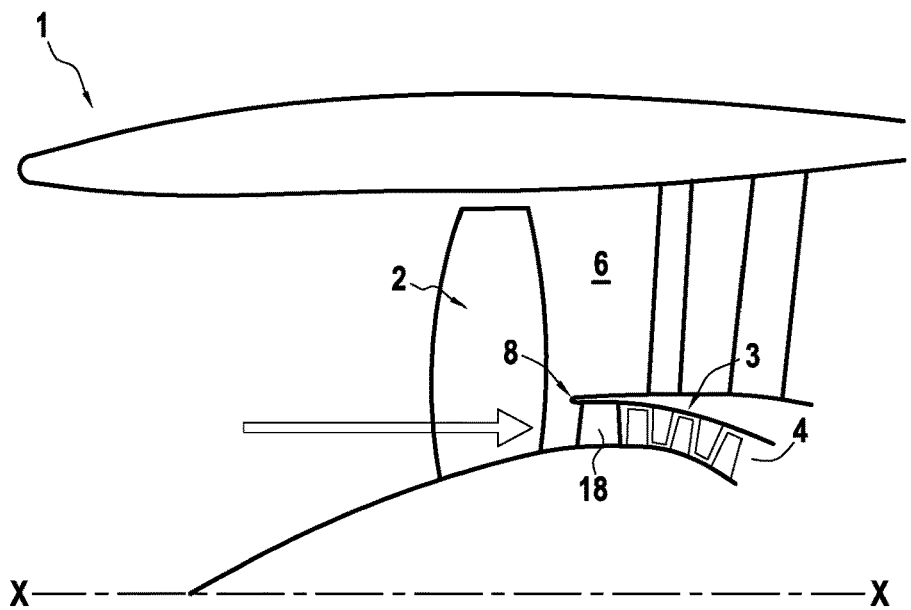
FIG. 1 is a fragmentary longitudinal section view of an aviation turbine engine fitted with a deicer device in accordance with the invention.

FIG. 1 shows part of an aviation turbine engine 1 of the two-spool bypass type to which the invention can be applied.

In known manner, the turbine engine 1 is axisymmetric about a longitudinal axis X-X and has an inlet at its upstream end that receives outside air, this air feeding a fan 2. Downstream from the fan 2, the air is split between a flow passage (or channel) 4 for a primary stream (or hot stream) and a flow passage 6 for a secondary stream (or cold stream).

The flows in these two passages 4 and 6 are split apart from each other at the passage inlets by a splitter nose 8. Once air has entered into the primary stream flow passage 4, it then passes through a low-pressure compressor 3 (or "booster"), a high-pressure compressor, a combustion chamber, and turbines (which elements are not shown in the figures), prior to being ejected to the outside of the engine.

Figure 2:
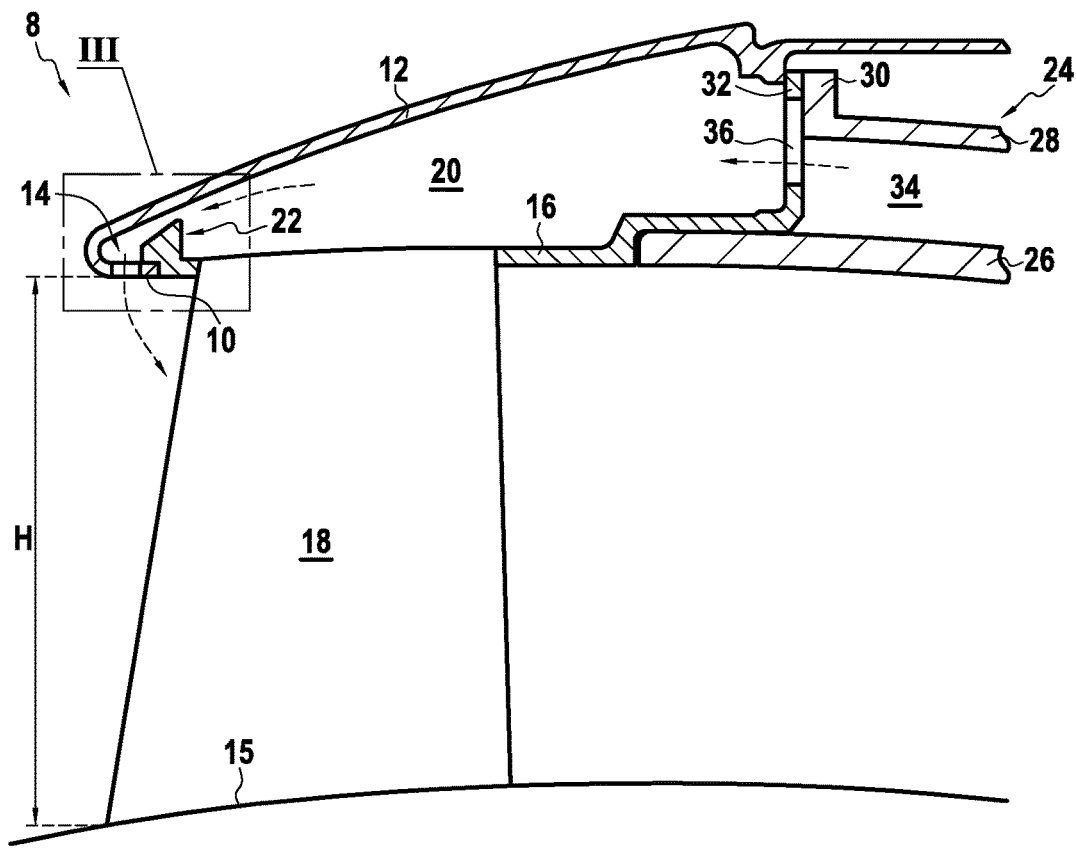
FIG. 2 is a view on a larger scale of the splitter nose of the FIG. 1 turbine engine.
Figure 3:
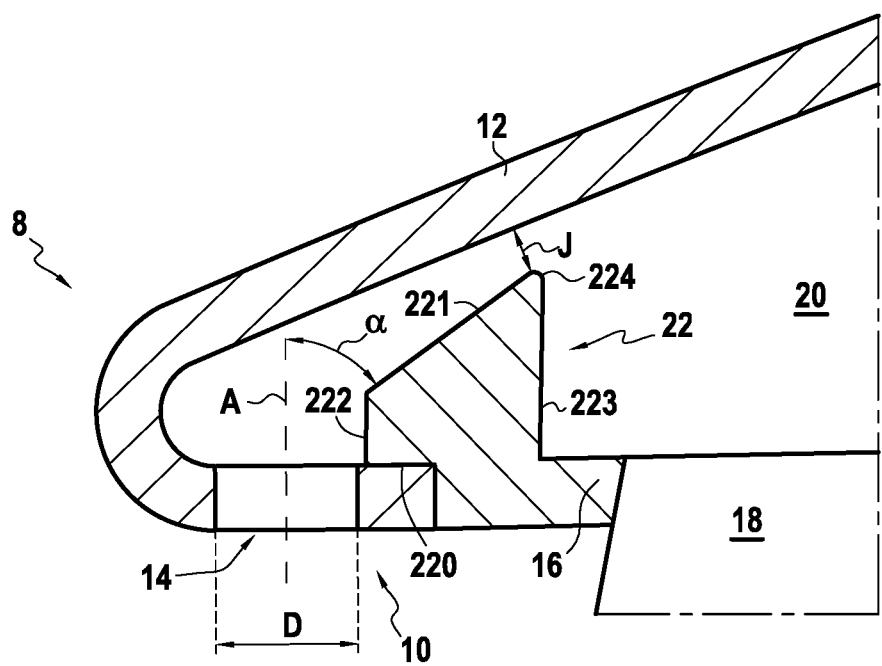
FIG. 3 is a view on a larger scale than FIG. 2 showing the hook of the inner shroud.

As shown in FIGS. 2 and 3, the splitter nose 8 has a longitudinal section at its upstream edge that is in the shape of a U or a rounded V, and it has an inner annular wall 10 defining the inlet of the primary stream flow passage 4, and an outer annular wall 12 defining the inside of the secondary stream flow passage 6. In the longitudinal direction, the outer annular wall 12 is longer than the inner annular wall 10.

The inner annular wall 12 of the splitter nose 8 includes holes forming injection orifices 14 for injecting hot air into the primary stream flow passage 4 along respective drilling axes A. The injection orifices 14 are distributed circumferentially around the inner annular wall 10. In this example, the axis A of each orifice 14 is substantially radial relative to the axis X-X of the turbine engine, i.e. the axis A is substantially perpendicular to the axis X-X. As can be seen in FIG. 2, the injection orifices 14 are spaced apart by a distance H from the wall 15 defining the inside of the primary stream flow passage (the distance H also corresponding to the height of the passage in register with the injection orifices 14). The injection orifices 14 may be circular, as in the example shown, or by way of example they may be oval. Under all circumstances, they may present a hydraulic diameter D that satisfies the inequality 0.02≤D/H≤0.06. In known manner, the hydraulic diameter is defined for air as the ratio between four times the area of the flow section of an orifice divided by the perimeter of the orifice. For any injection orifice 14 of circular section, the hydraulic diameter is equal to the diameter of the orifice.

The inner annular wall 10 of the splitter nose 8 is extended downstream by an inner shroud 16. The inner shroud 16 carries the inlet guide vanes 18 of the turbine engine. It should be observed that the positioning of the injection orifices 14 may be selected so that in operation, the jets of hot air delivered by said orifices 14 impact against the leading edges of the inlet guide vanes 18 in the primary stream flow passage. The inner and outer annular walls 10 and 12, and the inner shroud 16 define an annular cavity 20 inside the splitter nose 8. The inner shroud 16 is positioned and held at its upstream end against the inner annular wall 10 of the splitter nose 8 by a hook 22 integrated in said shroud 16, and at its downstream end by a structural casing 24 of the turbine engine.

In the example shown, the structural casing 24 comprises both an inner casing 26 extending the inner shroud 16 downstream, and against which the inner shroud 16 comes to bear; and also an outer casing 28 provided with a flange 30 for co-operating with a flange 32 present at the downstream end of the inner shroud 16. Between them, the inner and outer casings 26 and 28 define an annular channel 34 for conveying hot air, which channel leads into the cavity 20 of the splitter nose 8 via openings 36 present in the flange 32 of the inner shroud 16. Hot air injectors (not shown) serve to introduce hot air, e.g. bled from a compressor of the turbine engine, into the inside of the annular channel 34 for conveying hot air.

The hook 22 at the upstream end of the inner shroud 16 is shown in greater detail in FIG. 3. The hook 22 has an inner surface 220 resting on the inner annular wall 10 of the splitter nose 8, and an outer surface 221 facing the outer annular wall 12 of the nose 8. The hook 22 also has an upstream surface 222 and a downstream surface 223, which, in this example, are substantially parallel to each other, and which extend in a direction that is substantially a radial. The upstream surface 222 the hook 22 provides a connection between the inner surface 220 and the outer surface 221 at the upstream end. In this example, the upstream surface 222 is smaller than the downstream surface 223. In this example, the surfaces 220, 221, 222, and 223 of the hook 22 are all substantially straight lines in longitudinal section.

The hook 22 is preferably axisymmetric about the axis X-X, and it is positioned downstream from the injection orifices 14 without obstructing them, i.e. the hook 22 is not situated radially over the orifices 14. The hook 22 is offset from the injection orifices 14 in such a manner that the upstream surface 222 corresponding to the upstream end of the hook is situated downstream from the injection orifices 14.

In accordance with the invention, the outer surface 221 of the hook 22 facing the outer annular wall 12 of the splitter nose 8 forms an angle α of less than 90° relative to the axis A of an injection orifice (FIG. 3). The angle α may lie in the range 40° to 70° in order to improve the penetration of the jet of hot air into the primary stream flow passage. Thus, the outer surface 221 of the hook 22 slopes and comes progressively closer to the outer annular wall 12 of the nose 8 on going from upstream to downstream along the outer surface 221, i.e. on going away from the injection orifice 14. The slope of the outer surface 221 also serves to define varying clearance between the surface 221 and the outer annular wall 12, which clearance has some minimum value J. In the example shown, the minimum clearance J is the distance between a point situated on the circular edge 224 between the surfaces 221 and 223, and the outer annular wall 12. According to the invention, the minimum clearance J and the hydraulic diameter D of the injection orifices satisfy the following inequality:

$$0.2 \leq J/D \leq 0.6.$$

In operation, hot air is conveyed, e.g. along the channel 34, into the cavity 20 inside the splitter nose. The possible outlets for this stream of hot air (the air stream being represented by dashed-line arrows in FIG. 2) are constituted by the injection orifices 14. The stream of hot air thus flows towards the upstream end of the splitter nose 8 towards the hook 22. While the stream of air is approaching the hook 22, it is deflected outwards by the downstream surface 223 of the hook 22. Thereafter it needs to pass over the hook via the constriction in which the clearance J is at a minimum between the outer surface 221 of the hook 22 and the outer annular wall 12 of the nose 8. On passing through this constriction, the stream of hot air accelerates so as to impact against the end of the splitter nose 8 and heat it. Finally, the stream of air can run along the wall of the nose 8 at its upstream end so as to reach the injection orifices 14, which serve to project it into the passage in the form of jets of hot air. The jets of hot air as generated in this way can impact against the leading edges of the inlet guide vanes so as to deice them.

Studies have been undertaken that show a good distribution of the stream of hot air in the azimuth direction along the splitter nose, and also uniformity in the depth to which the jets created by the injection orifices penetrate into the passage. The device of the invention is thus more effective in performing the two functions of deicing both the splitter nose 8 and also the inlet guide vanes 18, and it does so without needing to increase the amount of hot air that is bled from the compressor, in comparison with prior art devices.

The invention claimed is:

1. An aviation turbine engine fan module comprising:
   a fan,
   a low-pressure compressor,
   inlet guide vanes situated upstream from the low-pressure compressor and downstream from the fan, and
   a deicer device for deicing both a splitter nose and also inlet guide vanes of a turbine engine, said deicer device comprising:
   a splitter nose for positioning downstream from the fan of the turbine engine in order to split a stream coming from the fan into primary and secondary stream flow channels of annular shape, said nose having an outer annular wall defining the inside of the secondary stream flow channel and an inner annular wall defining an inlet of the primary stream flow channel, said inner annular wall being provided with injection orifices positioned upstream from the inlet guide vanes and through which hot air is to be blown; and
   an inner shroud to which the inlet guide vanes are fastened and including a hook that is axisymmetric about a longitudinal axis of the turbine engine, said inner shroud being held axially at its upstream end against the inner annular wall by said hook,
   wherein the hook has an outer surface facing the outer annular wall and forming an angle of less than 90° with the axis of an injection orifice such that an outer surface of the hook comes progressively closer to the outer annular wall on going away from said injection orifice, the outer surface of the hook presenting a minimum amount of clearance J relative to the outer annular wall such that:

$$0.2 \leq J/D \leq 0.6$$

where D is the hydraulic diameter of the injection orifice.

2. The fan module according to claim 1, wherein the outer surface of the hook forms an angle lying in the range 40° to 70° with the axis of an injection orifice.

3. The fan module according to claim 1, wherein the hydraulic diameter D of the injection orifice satisfies the following inequality: $2\% \leq D/H \leq 6\%$, where H is a distance between the injection orifice and an inner wall of the primary stream flow channel.

4. The fan module according to claim 1, wherein each injection orifice presents a section that is circular.

5. The fan module according to claim 1, further comprising means for conveying hot air that are configured to deliver hot air upstream to an inside of the splitter nose.

6. An aviation turbine engine, comprising:
   the fan module according to claim 1.

* * * * *